March 17, 1970 G. B. COTTRELL 3,501,651
ELECTRONIC RATE GENERATOR
Filed March 24, 1967 4 Sheets-Sheet 1

INVENTOR.
GEORGE B. COTTRELL
BY
*Philip M. Hinderstein*
ATTORNEY

March 17, 1970  G. B. COTTRELL  3,501,651
ELECTRONIC RATE GENERATOR

Filed March 24, 1967  4 Sheets-Sheet 2

INVENTOR.
GEORGE B. COTTRELL

BY

ATTORNEY

FIG. 4c

*INVENTOR.*
GEORGE B. COTTRELL
BY
ATTORNEY

March 17, 1970  G. B. COTTRELL  3,501,651
ELECTRONIC RATE GENERATOR

Filed March 24, 1967  4 Sheets-Sheet 4

INVENTOR.
GEORGE B. COTTRELL
BY
Philip M. Hinderstein
ATTORNEY

United States Patent Office 3,501,651
Patented Mar. 17, 1970

3,501,651
ELECTRONIC RATE GENERATOR
George B. Cottrell, Cerritos, Calif., assignor to North American Rockwell Corporation
Filed Mar. 24, 1967, Ser. No. 625,817
Int. Cl. H03k 1/16
U.S. Cl. 307—295                    10 Claims

ABSTRACT OF THE DISCLOSURE

A circuit for deriving a D.C. signal whose magnitude is directly proportional to the angular rate of a rotating shaft. The rotating shaft drives a resolver which is operative to provide sine and cosine modulations of a carrier signal in accordance with the angular position of the shaft. The sine and cosine signals are differentiated to derive a pair of signals proportional to angular rate. A logic circuit is provided to select those portions of the differential sine wave that are generated when the position signal is of the proper sign. A second logic circuit is provided to perform a similar operation on the cosine signal. The sine and cosine signals are combined to provide a D.C. signal proportional to angular rate.

BACKGROUND OF THE INVENTION

Field of the invention

The present invention relates to an electronic rate generator and, more particularly, to an electronic circuit for developing a D.C. signal whose magnitude is directly proportional to the angular rate of a rotating shaft without using conventional tachometers or rate generators.

Description of the prior art

In numerous types of systems it is necessary to have an accurate indication of the angular rate of a rotating shaft. For example, the development of electrical signals proportional to angular rate is of prime importance in the design of control systems because servo damping and velocity control depend upon the accuracy of the rate signal. The usual methods of rate signal generation employ A.C. or D.C. tachometers, rotating mechanical devices, operating as drag cup or induction generators as the case may be. Such devices, however, are limited in their accuracy and are relatively expensive to build.

Another method of rate signal generation uses derivative networks employing resistive, capacitive, or inductive elements. Such networks are quite effective if the input signals do not reverse sign due to a multiplicity of electrical nulls. In other words, if the shaft rotation is converted into an electrical signal of sinusoidal shape, as the shaft rotates the electrical signal goes through a series of consecutive nulls. Depending upon the direction of rotation of the shaft, only one-half of the sinusoidal waveform will have the proper sign. Furthermore, only one-half of the null points will be stable mills, the other half being unstable. As a stable null is approached along the curve, the derivative has the proper sign. On the other hand, as an unstable null is being approached, the derivative has an improper sign. In a case where large angles are driven through that there are many consecutive nulls, a series of alternately proper and improper derivatives results. This result is of no value at all unless those portions of the differentiated sine wave that are generated when the position signal is of the proper sign can be segregated.

An additional problem arises when using derivative networks when the amplifier that is passing the sinusoidal signal saturates resulting in the signal becoming flat-topped. Since the derivative of a constant is zero, when there is saturation there is no derivative at all. Accordingly, saturation must be avoided.

SUMMARY OF THE INVENTION

According to the present invention, there is provided an electronic rate generator which develops an accurate D.C. signal which is directly proportional to the angular rate of a rotating shaft. The rotating shaft drives a resolver which is operative to provide sine and cosine modulations of a carrier signal in accordance with the angular position of the shaft. The sine and cosine signals are differentiated to derive a pair of signals proportional to angular rate. A logic circuit is provided to select those portions of the differentiated sine wave that are generated when the position signal is of the proper sign. A second logic circuit is provided to perform a similar operation on the cosine signal. The sine and cosine signals are combined to provide a D.C. signal proportional to angular rate.

OBJECTS

It is, therefore, an object of the present invention to provide an electronic rate generator which will accurately indicate the angular rate of a rotary shaft.

It is a further object of the present invention to provide means for generating an electrical signal proportional to angular rate without the use of A.C. or D.C. tachometers.

It is a still further object of the present invention to provide means for generating an electrical signal proportional to the angular rate of a rotating shaft in which the shaft position signal is converted into a sinusoidal signal and in which logical means is provided to segregate those portions of the sine wave that have the proper sign.

It is another object of the present invention to provide means for generating electrical signals proportional to angular rate in which the rate signal is converted into sinusoidal and cosinusoidal waves which are combined to provide a smooth D.C. output.

Still other objects, features, and attendant advantages of the present invention will become apparent to those skilled in the art from a reading of the following detailed description of a preferred embodiment constructed in accordance therewith, taken in conjunction with the accompanying drawings, wherein:

BRIEF DECRIPTION OF THE DRAWINGS

Figure 1:
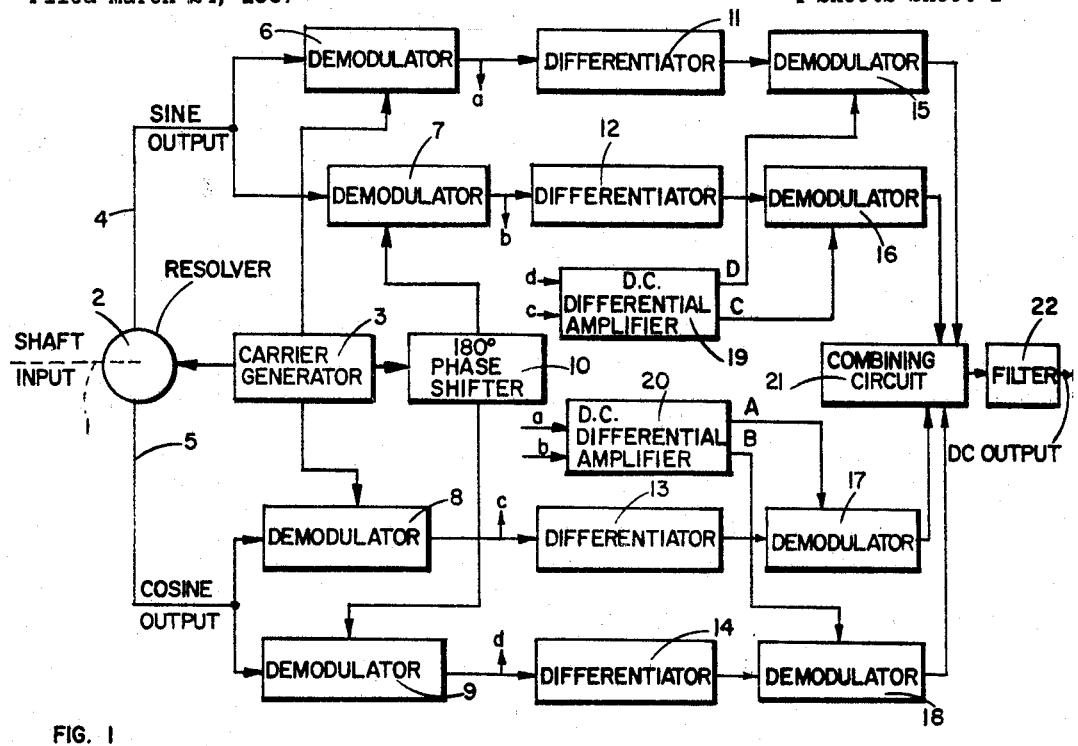
FIGURE 1 is a block diagram showing the novel features of the present invention.
Figure 2:
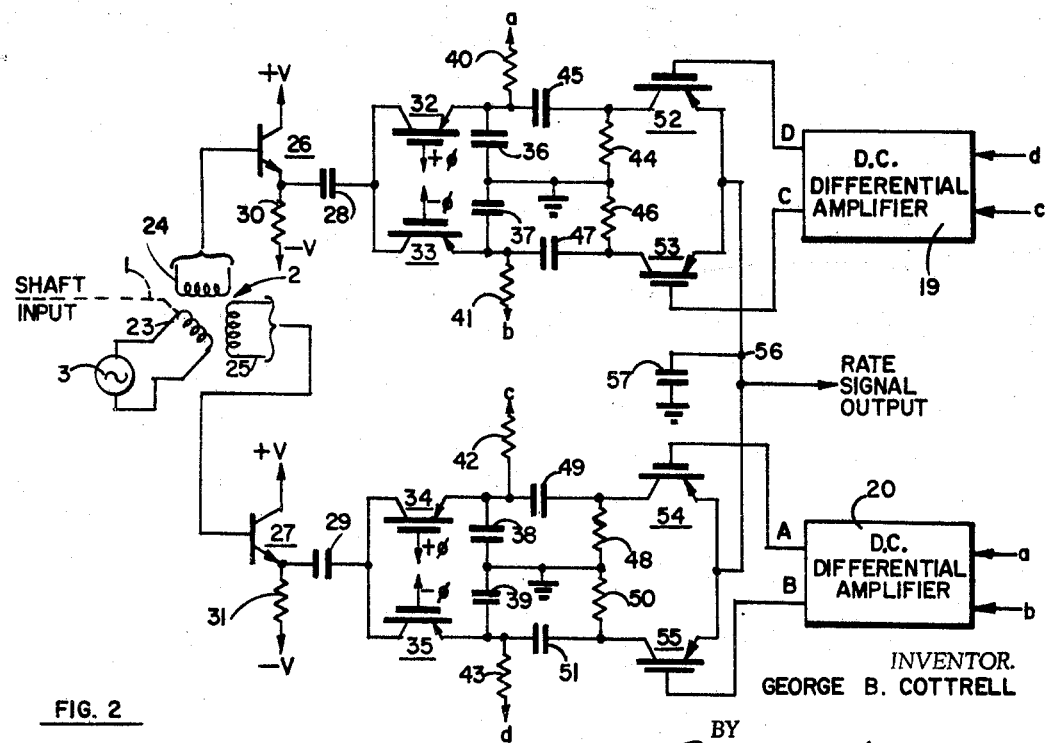
FIGURE 2 is a more detailed circuit diagram of the preferred embodiment of the present invention.
Figure 5A:
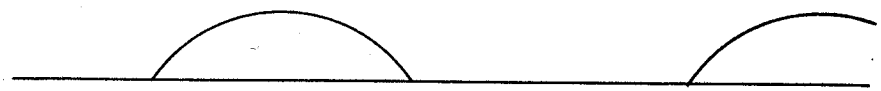
Figure 5B:
Figure 5C:
Figure 5D:
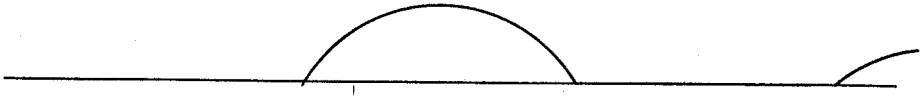
Figure 5E:
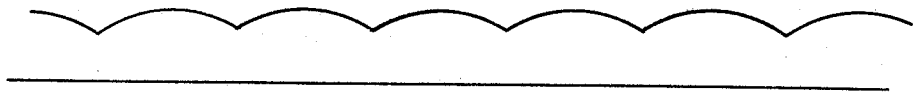
Figure 6:
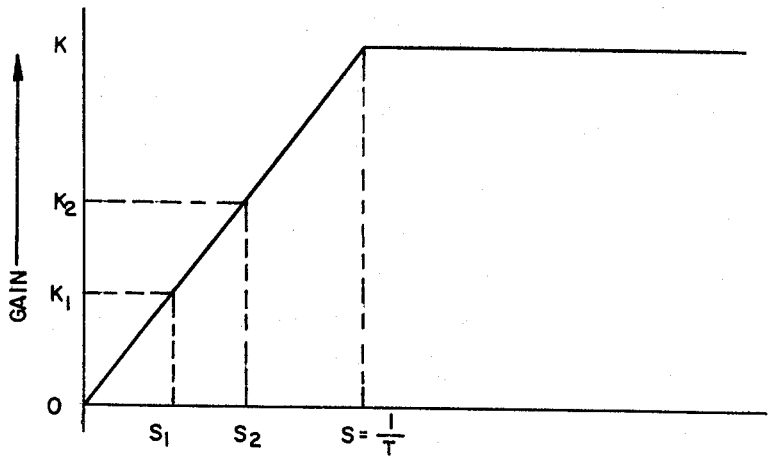

FIGURES 3a–3h, 4a–4h and 5a–5e show waveforms useful in explaining the operation of the circuits of FIGURES 1 and 2; and FIGURE 6 shows a curve of gain versus frequency for the derivative networks of FIGURES 1 and 2.

DESCRIPTION OF THE PREFERRED EMBODIMENT

Referring now to the drawings and, more particularly, to FIGURE 1 thereof, there is shown a block diagram of the present invention. In FIGURE 1, the input is derived from a shaft 1 whose angular rate is to be measured. Shaft 1 is coupled to a resolver 2 which receives an excitation signal from a carrier generator 3. Resolver 2 has a pair of output windings for deriving a pair of suppressed carrier signals which are directly proportional to the sine and cosine, respectively, of the angular position of shaft 1. The sine output is provided on line 4 whereas the cosine output is provided on line 5. The sine output on line 4 is applied to a pair of half-wave demodulators 6 and 7. The cosine output on line 5 is applied to a second pair of half-wave demodulators 8 and 9. Demodulators 6 and 8 receive, as their second inputs, the signal from carrier generator 3. Demodulators 7 and 9 receive, as their second inputs, the signal from a 180° phase shifter 10 which is driven by carrier generator 3. The outputs of half-wave demodulators 6, 7, 8 and 9 are applied to a plurality of differentiator circuits 11, 12, 13 and 14, respectively. The outputs of differentiator circuits 11, 12, 13 and 14 are applied to a plurality of half-wave demodulators 15, 16, 17 and 18, respectively.

The outputs of demodulators 6, 7, 8 and 9 are also applied to a pair of direct current differential amplifiers 19 and 20. More specifically, the outputs of demodulators 6 and 7 are applied to the inputs of differential amplifier 20 whereas the outputs of demodulators 8 and 9 are applied to the inputs of differential amplifier 19. The differential outputs of amplifier 19 are applied as second inputs to demodulators 15 and 16 whereas the differential outputs of amplifier 20 are applied as second inputs to demodulators 17 and 18. The outputs of demodulators 15, 16, 17 and 18 are combined in a combining circuit 21 whose output is applied to a filter circuit 22. The output of filter circuit 22 is a D.C. signal whose amplitude is directly proportional to the angular rate of input shaft 1.

In operation, the input shaft angle is converted to sinusoidal and cosinusoidal signals on lines 4 and 5 by resolver 2 which derives its excitation signal from carrier generator 3. Demodulators 6 and 7 receive the sine output signal and demodulators 8 and 9 receive the cosine output signal. Demodulators 6 and 8 are driven by carrier generator 3 to remove the carrier signal and to provide pure sine and cosine signals at their outputs, respectively. Since demodulators 7 and 9 are driven by signals which are 180° out of phase with the excitation signal from carrier generator 3, the outputs of demodulators 7 and 9 are sinusoidal and cosinusoidal signals which are 180° out of phase with the signal outputs of demodulators 6 and 8, respectively. In this manner, the signal at the output of demodulator 6 is related to the sine of the resolver shaft angle whereas the signal at the output of demodulator 8 is related to the cosine of the shaft angle. The outputs of demodulator circuits 6 and 7 are applied to drive the high gain, direct current differential amplifier 20. The sinusoidal signals developed at points *a* and *b*, at the outputs of demodulators 6 and 7, cause high gain amplifier 20 to saturate, thus producing, at the output of amplifier 20, signals which are square waves at the input frequency. In like manner, the signals deveoped at *c* and *d*, at the outputs of demodulators 8 and 9, are coupled to drive the high gain, direct current differential amplifier 19 which is caused to saturate, thus producing, at its output, signals which are square waves at the input frequency.

The signals at *a, b, c* and *d* are also modified by differentiator circuits 11, 12, 13 and 14 whose transfer functions are all equal. Differentiator networks 11–14, for all frequencies of interest, are essentially pure derivative networks. In this manner, the signals at the outputs of differentiators 11 and 12 are cosinusoidal and the signals at the output of differentiators 13 and 14 are sinusoidal. In addition, the square wave outputs of differential amplifier 19 are in phase with the cosinusoidal outputs of differentiators 11 and 12. Similarly, the square wave outputs of differential amplifier 20 are in phase with the sinusoidal outputs of differentiators 13 and 14. The derivative signals from differentiators 11, 12, 13 and 14 are then demodulated by demodulators 15, 16, 17 and 18, respectively, which are driven by the outputs of amplifiers 19 and 20, respectively. In this manner, the outputs of demodulators 15 and 16 are half-wave demodulated cosinusoidal signals which are 180° out of phase. When the outputs of demodulators 15 and 16 are combined in combining circuit 21 there is provided a full-wave demodulated cosinusoidal signal. In like manner, the outputs of demodulators 17 and 18 are half-wave demodulated sinusoidal signals which are 180° out of phase. The outputs of demodulators 17 and 18 are combined in combining circuit 21 to provide a full-wave demodulated sinusoidal signal. Combining circuit 21 is also operative to combine the outputs of demodulators 15 and 16 with the outputs of demodulators 17 and 18 to provide a composite signal which is then filtered by filter 22 to eliminate the ripple component and to provide a D.C. output signal whose magnitude is directly proportional to the angular rate of shaft 1.

Referring now to FIGURE 2, there is shown a circuit diagram of the preferred embodiment of the present invention. Reference will also be made to FIGURES 3a–3h, 4a–4h, and 5a–5e which show waveforms useful in explaining the operation of the present invention.

Referring to FIGURE 2, input shaft 1 is coupled to drive the rotor 23 of resolver 2 which receives its excitation signal from carrier generator 3. Resolver 2 is provided with a sine winding 24 and a cosine winding 25. The sine output from winding 24 is applied to the base of a transistor emitter follower 26 whereas the cosine output from winding 25 is applied to the base of a transistor emitter follower 27. The suppressed carrier signals from windings 24 and 25 are applied to emitter followers 26 and 27 to provide an impedance transformation. Emitter followers 26 and 27 are necessary to prevent the rate generator circuit from imposing loads on the output of resolver 2 which would diminish the quality of the output signals. In other words, only a very small current drain on resolver 2 may be tolerated for very high accuracy work. However, in order to drive the remainder of the rate generator, currents will be demanded which far exceed the capabilities of resolver 2. Therefore, emitter followers 26 and 27 are provided, operating as impedance matching devices to provide very low output impedances for driving the remainder of the rate generator. The outputs of emitter followers 26 and 27 are substantially the same as the inputs thereto except that there is a D.C. level superimposed thereon. Capacitors 28 and 29 eliminate the D.C. levels so that at the right hand side of capacitors 28 and 29 there is substantially the same signal as at the inputs to transistors 26 and 27.

The collectors of transistors 26 and 27 are directly connected to a positive voltage source whereas the emitters of transistors 26 and 27 are connected to a negative voltage source via resistors 30 and 31, respectively. The values of resistors 30 and 31 are selected to establish the average collector current of each transistor.

Figure 3A:
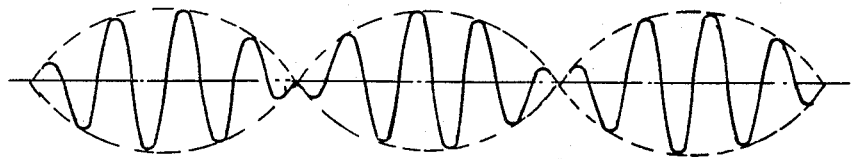
Figure 3B:
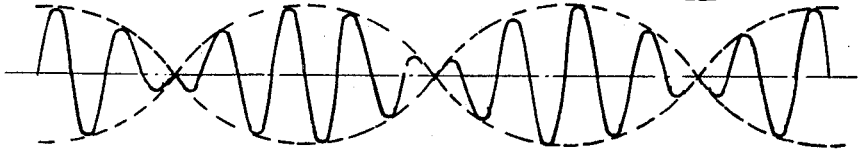

The sinusoidal output signal derived from winding 24 is shown in FIGURE 3a whereas the cosinusoidal output signal derived from winding 25 is shown in FIGURE 3b. In FIGURES 3a and 3b, the envelopes of the carriers are shown dotted.

Returning to FIGURE 2, capacitor 28 is connected to the drain electrodes of a pair of insulated gate field effect transistors 32 and 33 which are used as half-wave demodulators. Similarly, capacitor 29 is connected to the drain electrodes of a pair of insulated gate field effect transistors 34 and 35 which are also used as half-wave demodulators. Transistor 32 is gated by a signal which is in-phase with the excitation signal from carrier generator 3 whereas transistor 33 is gated by a signal which is 180° out of phase with the excitation signal. The in-phase signal is denoted $+\phi$ whereas the out-of-phase signal is denoted $-\phi$ ($-\phi$ being 180° in phase relation to $+\phi$. In like manner, transistor 34 is gated by the in-phase signal $+\phi$ and transistor 35 is gated by the out-of-phase signal $-\phi$. The outputs from the source electrodes of transistors 32 and 33 are derived across a pair of capacitors 36 and 37, respectively, whereas the outputs from the source electrodes of transistors 34 and 35 are derived across a pair of capacitors 38 and 39, respectively.

Figure 3C:
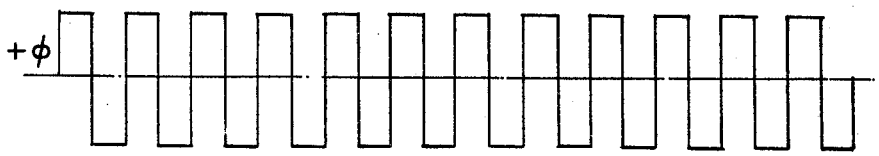
Figure 3D:
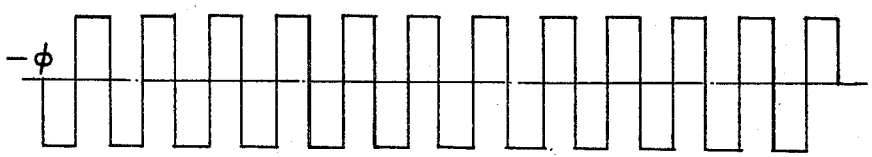

The $+\phi$ and $-\phi$ signals used to drive transistors 32–35 are shown in FIGURES 3c and 3d, respectively. Since it is necessary to have certain voltage characteristics to drive insulated gate field effect transistors, the two phases of the excitation frequency are squared for this purpose.

Figure 3E:
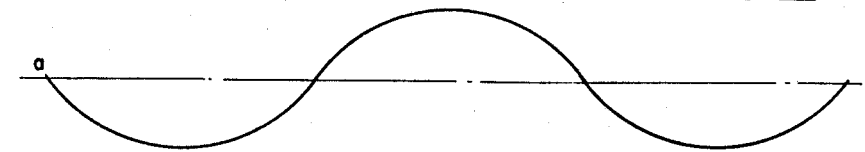
Figure 3F:
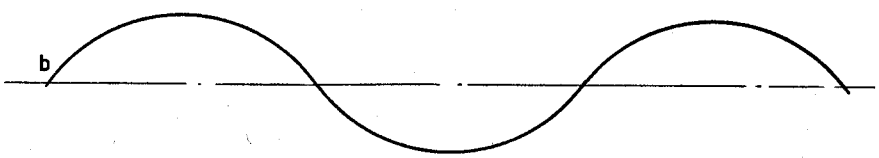
Figure 3G:
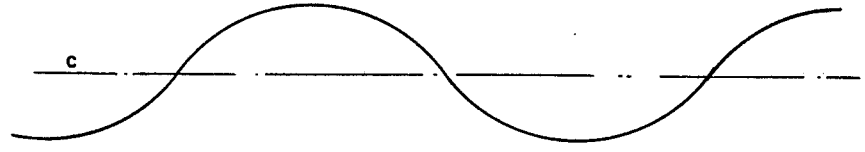
Figure 3H:
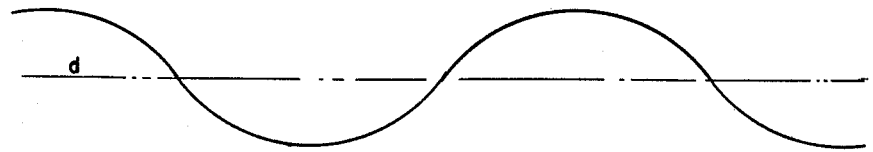

The signal across capacitor 36 is shown in FIGURE 36 is shown in FIGURE 3e, the signal across capacitor 37 is shown in FIGURE 3f, the signal across capacitor 38 is shown in FIGURE 3g and the signal across capacitor 39 is shown in FIGURE 3h. As can be seen from FIGURES 3e through 3h, the signals across capacitors 36 and 37 are sinusoidal in shape and 180° out of phase with each other. As can be seen from FIGURES 3g and 3h, the signals across capacitors 38 and 39 are cosinusoidal in shape and 180° out of phase with each other. In addition, the voltages across capacitors 36 and 37 are related to the sine of the resolver shaft angle whereas the voltages across capacitors 38 and 39 are related to the cosine of the shaft angle.

Figure 4A:
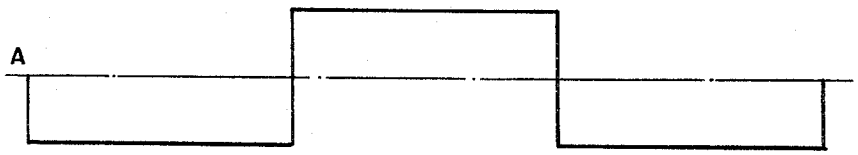
Figure 4B:

A pair of coupling resistors 40 and 41 are operative to couple the signals across capacitors 36 and 37, respectively, to drive high gain, D.C. differential amplifier 20 which may consist of a general purpose integrating circuit. The signals developed at points $a$ and $b$ cause amplifier 20 to saturate thus producing signals A and B which are square waves at the input frequency. The outputs of D.C. differential amplifier 20 are shown in FIGURES 4a and 4b.

Figure 4D:
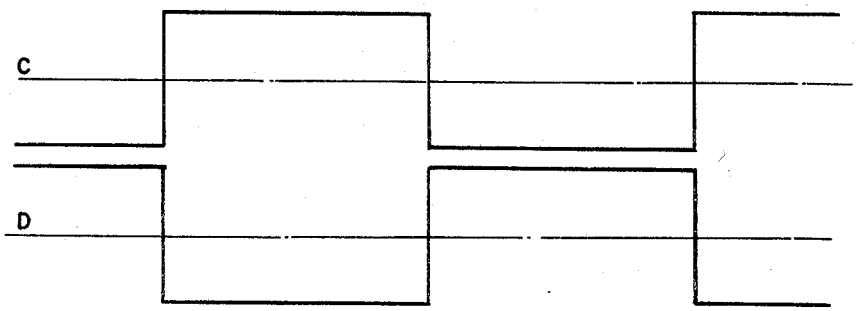
Figure 4E:
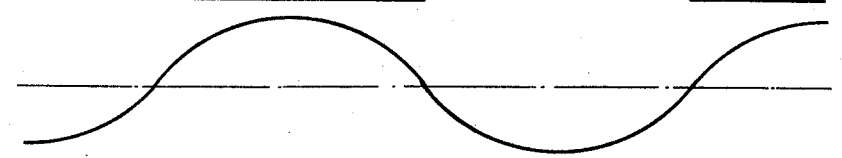
Figure 4F:
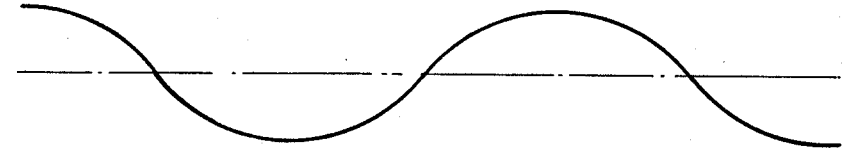
Figure 4G:
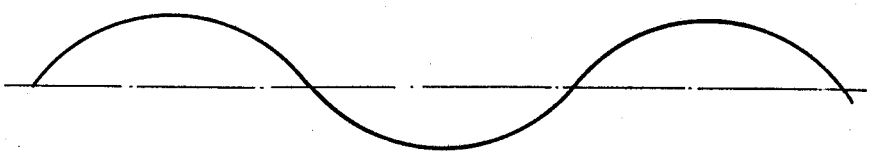
Figure 4H:

Similarly, a pair of coupling resistors 42 and 43 are operative to couple the signals across capacitors 38 and 39, respectively, to drive high gain, D.C. differential amplifier 19 which also may consist of a general purpose integrating circuit. The signals developed at points $c$ and $d$ cause amplifier 19 to saturate thus producing signals C and D which are square waves at the input frequency. The outputs of D.C. differential amplifier 19 are shown in FIGURES 4c and 4d.

The voltages across capacitors 36, 37, 38 and 39 are also applied to a plurality of RC networks 44–45, 46–47, 48–49, and 50–51 whose transfer functions, F($s$), since all have the same time constants, are equal. The transfer function may be represented by the equation $$F(s) = \frac{SCR}{SCR+1} = \frac{TS}{TS+1} \quad (1)$$

where S is the La Place operator, C is the value of the capacitance of capacitors 45, 47, 49 and 51, R is the value of the resistance of resistors 44, 46, 48 and 50, and CR is equal to T. The asymptotic representation of the transfer function indicates that the 0 in the numerator dominates until the pole at $S=1/T$ takes over. Thus, this network from frequencies of $S=0$ to $S=1/T$ is essentially a pure derivative network and approaches unity as frequency increases. The transfer function for these RC networks is shown in FIGURE 6. The RC time constant is chosen to provide derivative signals at all frequencies of interest. Since those frequencies usually are from 0 to a few radians per second, the time constant is on the order of .04 second. The signals across resistors 44, 46, 48 and 50 are shown in FIGURES 4e, 4f, 4g and 4h, respectively.

The derivative signals across resistors 44, 46, 48 and 50 are applied to the drain electrodes of a plurality of insulated gate field effect transistors 52, 53, 54 and 55, respectively, operating as half-wave demodulators. Transistors 52–55 are driven by the square wave voltages at points D, C, A, and B, respectively, from the outputs of D.C. differential amplifiers 19 and 20. The resultant signals at the outputs of transistors 52–55 are shown in FIGURES 5a, 5b, 5c and 5d, respectively. The outputs of transistors 52–55 are combined at point 56 to derive a signal as shown in FIGURE 5e. A capacitor 57 is connected between point 56 and ground to filter out high frequency noise caused by the chopping action of insulated gate field effect transistors 52–55. The resultant output at point 56 is a smooth D.C. signal whose magnitude is directly proportional to the angular rate of input shaft 1.

The manner in which the present invention is operative to provide a D.C. rate signal may be understood with reference to the waveforms of FIGURES 3a–3h, 4a–4h, and 5a–5e, and with reference to FIGURE 6. As the angular rate of shaft 1 increases, the amplitude of the waveforms in FIGURES 3e–3h, representing the outputs of transistors 32–35, remain constant although the frequency increases. The outputs of differential amplifiers 19 and 20, as shown in FIGURES 4a–4d, also remain constant in amplitude since the amplifiers are driven to saturation. However, as the frequency increases, the amplitude of the outputs across resistors 44, 46, 48 and 50, as shown in FIGURES 4e–4h, increases. The reason why this occurs may be seen from FIGURE 6 which shows the transfer function of RC networks 44–45, 46–47, 48–49, and 50–51. As the input frequency increases from frequency $S_1$ to $S_2$, the gain of the derivative networks also increase from $K_1$ to $K_2$. As a result, the amplitude as well as the frequency of the signals across resistors 44, 46, 48 and 50 increases. When these signals are applied to transistors 52–55, there is provided a plurality of half-wave demodulated sinusoidal signals whose amplitudes and frequencies are greater than that shown in FIGURES 5a–5d. These signals are then combined at combining point 56 and smoothed by filter 57 to provide a D.C. signal whose magnitude indicates the angular rate of input shaft 1.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

What is claimed is:

1. A rate generator for providing an output signal as a function of the angular rate of a rotating shaft comprising, in combination:

means responsive to said rotating shaft for generating a first signal as a function of the angular position thereof, said first signal periodically reversing sign;

means responsive to said first signal for generating a second signal as a function of the derivative thereof, said second signal varying as a function of the angular rate of said shaft;

logic means for selecting those portions of said second signal which are generated when said first signal has the proper sign;

means responsive to said rotating shaft for generating a third signal as a function of the angular position thereof, said third signal being 180° out of phase with said first signal, said third signal periodically reversing sign;

means responsive to said third signal for generating a fourth signal as a function of the derivative thereof, said fourth signal varying as a function of the angular rate of said shaft;

logic means for selecting those portions of said fourth signal which are generated when said third signal has the proper sign; and means for combining the selected portions of said second and fourth signals so as to derive said output signal.

2. The rate generator of claim 1 wherein said means for generating said first signal comprises:

a source of excitation signal;

a resolver having a rotor and an output winding, said rotor adapted to be driven by said rotating shaft, said rotor receiving said excitation signal; and a half-wave demodulator coupled to said output winding and said source, said first signal being derived at the output of said demodulator.

3. The rate generator of claim 2 wherein said half-wave demodulator comprises:

an insulated gate field effect transistor having drain, source and gate electrodes, said drain electrode being coupled to said first output winding and said gate electrode being coupled to said source of excitation signal, said source electrode providing the output of said demodulator.

4. The rate generator of claim 1 wherein said means for generating said first and third signals comprises:
a source of excitation signal;
phase shifting means coupled to said source for providing a signal which is 180° out of phase with said excitation signal;
a resolver having a rotor and an output winding, said rotor adapted to be driven by said rotating shaft, said rotor receiving said excitation signal; and
first and second half-wave demodulators coupled to said output winding, said first demodulator being coupled to said source, said second demodulator being coupled to said phase shifting means.

5. The rate generator of claim 4 wherein said first and second half-wave demodulators comprise:
first and second insulated gate field effect transistors having drain, source and gate eelctrodes, said drain electrodes being coupled to said first output winding, the gate electrode of said first transistor being coupled to said source of excitation signal, the gate electrode of said second transistor being coupled to said phase shifting means, the source electrodes of said first and second transistors providing the outputs of said first and second demodulators, respectively.

6. The rate generator of claim 1 further comprising:
means responsive to said rotating shaft for generating a fifth signal as a function of the angular position thereof, said fifth signal being 90° out of phase with said first signal, said fifth signal periodically reversing sign;
means responsive to said fifth signal for generating a sixth signal as a function of the derivative thereof, said sixth signal varying as a function of the angular rate of said shaft; and
logic means for selecting those portions of said sixth signal which are generated when said fifth signal has the proper sign;
said combining means being operative to combine the selected portions of said second, fourth and sixth signals.

7. The rate generator of claim 6 further comprising:
means responsive to said seventh signal for generating seventh signal as a function of the angular position thereof, said seventh signal being 180° out of phase with said fifth signal, said seventh signal periodically reversing sign;
means responsive to said seventh signal for generating an eighth signal as a function of the derivative thereof, said eighth signal varying as a function of the angular rate of said shaft; and
logic means for selecting those portions of said eighth signal which are generated when said seventh signal has the proper sign;
said combining means being operative to combine the selected portions of said second, fourth, sixth and eighth signals.

8. The rate generator of claim 7 further comprising:
means for filtering the output of said combining means to eliminate high frequency components from said output signal.

9. The rate generator of claim 7 wherein said means for generating said first, third, fifth and seventh signals comprises:
a source of excitation signal;
phase shifting means coupled to said source for providing a signal which is 180° out of phase with said excitation signal;
a resolver having a rotor and first and second output windings, said rotor adapted to be driven by said rotating shaft, said rotor receiving said excitation signal, said first output winding providing a signal which varies as the sine of the shaft position and said second output winding providing a signal which varies as the cosine of the shaft position; and
first, second, third and fourth half-wave demodulators, said first and second demodulators being coupled to said first output winding and said third and fourth demodulators being coupled to said second output winding, said first and third demodulators being coupled to said source and said second and fourth demodulators being coupled to said phase shifting means.

10. The rate generator of claim 9 wherein said logic means comprises:
first and second differential amplifiers responsive to signals at the inputs thereto for providing the integrals thereof, said first differential amplifier responsively coupled to the outputs of said third and fourth half-wave demodulators, said second differential amplifier responsively coupled to the outputs of said first and second half-wave demodulators; and
fifth, sixth, seventh and eighth half-wave demodulators, said fifth and sixth demodulators operative to receive said second and fourth signals, respectively, and the differential outputs of said first differential amplifier, said seventh and eighth demodulators operative to receive said sixth and eighth signals, respectively, and the differential outputs of said second differential amplifier, whereby the selected portions of said second, fourth, sixth and eighth signals appear at the outputs of said fifth, sixth, seventh and eighth demodulators, respectively.

References Cited

UNITED STATES PATENTS 2,809,339 10/1957 Guggi _____ 318—327
3,259,819 7/1966 Heiser _____ 318—20.427

JOHN S. HEYMAN, Primary Examiner

D. M. CARTER, Assistant Examiner

U.S. Cl. X.R.

318—326